US00RE48268E

(19) United States
(12) Reissued Patent
Busley et al.

(10) Patent Number: US RE48,268 E
(45) Date of Reissued Patent: Oct. 20, 2020

(54) CONSTRUCTION MACHINE, IN PARTICULAR ROAD MILLING MACHINE, RECYCLER OR STABILIZER, AS WELL AS DRIVE TRAIN FOR CONSTRUCTION MACHINES OF THIS TYPE

(71) Applicant: Wirtgen GmbH, Windhagen (DE)

(72) Inventors: Peter Busley, Linz/Rhein (DE); Dieter Simons, Buchholz (DE)

(73) Assignee: Wirtgen GmbH (DE)

(21) Appl. No.: 15/934,603

(22) Filed: Mar. 23, 2018

Related U.S. Patent Documents

Reissue of:
(64) Patent No.: 8,408,659
Issued: Apr. 2, 2013
Appl. No.: 12/985,400
Filed: Jan. 6, 2011

U.S. Applications:
(63) Continuation of application No. 11/918,247, filed as application No. PCT/EP2006/060907 on Mar. 21, 2006, now Pat. No. 7,891,742.

(30) Foreign Application Priority Data

Apr. 15, 2005 (DE) ..... 10 2005 017 754

(51) Int. Cl.
*E01C 23/088* (2006.01)
*E01C 23/12* (2006.01)
(Continued)

(52) U.S. Cl.
CPC ..... *E01C 23/088* (2013.01); *B60K 17/02* (2013.01); *B60K 17/04* (2013.01); *B60K 17/28* (2013.01);
(Continued)

(58) Field of Classification Search
CPC .... E01C 23/088; E01C 23/085; E01C 23/127; E01C 23/122; E21C 27/24; E21C 31/02;
(Continued)

(56) References Cited

U.S. PATENT DOCUMENTS 1,445,617 A 2/1923 Jehu
3,414,327 A * 12/1968 Austin ..... E01C 23/088 299/1.5
(Continued)

FOREIGN PATENT DOCUMENTS

AT 397826 B 7/1994
CH 606626 A5 11/1978
(Continued)

OTHER PUBLICATIONS

English translation of CH-606626-A5 accessed at <http://translationportal.epo.org/emtp/translate/?ACTION=description-retrieval&COUNTRY=CH&ENGINE=google&FORMAT=docdb&KIND=A5&LOCALE=en_EP&NUMBER=606626&OPS=ops.epo.org/3.2&SRCLANG=de&TRGLANG=en>.*
(Continued)

*Primary Examiner* — Peter C English
(74) *Attorney, Agent, or Firm* — Lucian Wayne Beavers; Patterson Intellectual Property Law, PC

(57) ABSTRACT

A construction machine, in particular road milling machine, recycler or stabilizer, with a machine frame (4) that is carried by a chassis (2) with a working drum (6) and a drive train (8) comprising at the least a drive engine (10), a traction mechanism (12) for the mechanical drive of the working drum (6) with a drive element, an output element and a traction element (30), a device (14) for switching the torque between the drive engine (10) and working drum (6), and device (16) for driving at least one hydraulic pump; it is provided that elements of the drive train (8) are divided into at least two groups, the first group (3) shows at least the drive engine (10), the second group (5) shows at least the drive element (11) of the traction mechanism, and where the first and the second groups (3, 5) are connected to one another via an articulated coupling device (20).

39 Claims, 3 Drawing Sheets

(51) Int. Cl.

| | |
|---|---|
| ***B60K 17/02*** | (2006.01) |
| ***B60K 17/04*** | (2006.01) |
| ***B60K 17/28*** | (2006.01) |
| ***B60K 25/02*** | (2006.01) |

(52) U.S. Cl.
CPC ..... *E01C 23/127* (2013.01); *B60K 2025/022* (2013.01)

(58) Field of Classification Search
CPC .. E21C 31/06; E02F 3/20; E02F 3/283; E02F 3/84; E02F 9/20; E02F 9/22; E02F 9/2292; B60K 2025/022; B60K 25/02; B60K 17/02; B60K 17/04; B60K 17/28
See application file for complete search history.

(56) References Cited

U.S. PATENT DOCUMENTS

| | | | | |
|---|---|---|---|---|
| 3,779,608 | A | 12/1973 | Hatcher et al. | |
| 3,796,462 | A | 3/1974 | Staab | |
| 4,193,636 | A | 3/1980 | Jakob | |
| 4,343,513 | A * | 8/1982 | Godbersen | E01C 23/088 172/3 |
| 4,929,121 | A | 5/1990 | Lent et al. | |
| 4,934,978 | A | 6/1990 | Arzberger et al. | |
| 5,203,388 | A | 4/1993 | Bowling | |
| 5,378,080 | A | 1/1995 | Dickson | |
| 5,383,743 | A | 1/1995 | Swisher, Jr. | |
| 5,657,803 | A | 8/1997 | Kappel et al. | |
| 5,809,985 | A | 9/1998 | Kingsley et al. | |
| 6,877,818 | B1 | 4/2005 | Gaertner et al. | |
| 7,891,742 | B2 * | 2/2011 | Busley et al. | 299/39.1 |
| 2004/0021364 | A1 | 2/2004 | Busley et al. | |
| 2004/0231910 | A1 | 11/2004 | Mercier et al. | |
| 2004/0237490 | A1 | 12/2004 | Yasuda et al. | |
| 2005/0016304 | A1 * | 1/2005 | Ishii et al. | B60K 17/28 74/15.4 |

FOREIGN PATENT DOCUMENTS

| | | | | |
|---|---|---|---|---|
| CN | 1143919 | A | 2/1997 | |
| DE | 2331588 | A1 | 1/1975 | |
| DE | 3149768 | A1 | 6/1983 | |
| DE | 10031195 | C1 | 1/2002 | |
| DE | 10300745 | A1 | 7/2004 | |
| EP | 0080831 | A1 | 6/1983 | |
| EP | 305658 | A1 | 3/1989 | |
| EP | 1875004 | B1 | 7/2010 | |
| WO | WO-0201005 | A1 * | 1/2002 | E01C 23/088 |

OTHER PUBLICATIONS

English translation of DE-3149768-A1 accessed at <http://translationportal.epo.org/emtp/translate/?ACTION=description-retrieval&COUNTRY=DE&ENGINE=google&FORMAT=docdb&KIND=A1&LOCALE=en_EP&NUMBER=3149768&OPS=ops.epo.org/3.2&SRCLANG=de&TRGLANG=en>.*
English translation of Second Brief of Catepillar (in Italian litigation) (41 pages) (not prior art).
Parts Manual for PM-565 dated Nov. 1999 (733 pages, uploaded in 4 parts) (Exhibit 79).
Parts Manual for PM-565 dated Sep. 2001 (1029 pages, uploaded in 6 parts) (Exhibit 80).
Operation and Maintenance Manual for PM-565 dated Jan. 1995 (152 pages) (Exhibit 81).
Technical Presentation (STMG) for PM-565 dated Aug. 1993 (182 pages, uploaded in 4 parts) (Exhibit 82).
Excerpt from the Disassembly and Assembly: 3408 Engine Supplement manual for PM-565 dated Jun. 1993 (5 pages) (Exhibit 83).
Excerpt from the Disassembly and Assembly: Cold Planer Machine Systems manual for PM-565 dated Jun. 1993 (3 pages) (Exhibit 84).
Statement by Mr. Michael W. Netka, dated Oct. 19, 2017, concerning, among other things: (i) the sale of several PM-565 cold planers in the period 1994-1996; and (ii) Catepillar's Corporate Procedure in force during the same period in relation to the supply of technical manuals together with each machine sold (18 pages) (Exhibit 85).
Excerpt from Catepillar's Corporate Procedure, Aug. 28, 1991, concerning the Technical Literature and Technical Information (4 pages) (Exhibit 86).
Catepillar's Factory Notification List, Version No. 274 of Feb. 1995 (7 pages) (Exhibit 87).
Catepillar's Factory Notification List, Version No. 293 of Sep. 1996 (8 pages.) (Exhibit 88).
Sales invoice for a PM-565 machine, Serial No. 3TK00096, dated Sep. 15, 1995 (1 page) (Exhibit 89).
Shipping order for a PM-565 machine, Serial No. 3TK00105, dated Mar. 5, 1996 (1 page) (Exhibit 90).
PM-565B brochure dated Aug. 1997 (8 pages) (Exhibit 91).
PM-565B brochure dated Jul. 1998 (8 pages) (Exhibit 92).
Parts Manual for PM-565B dated Feb. 2001 (951 pages, uploaded in 6 parts) (Exhibit 93).
Operating and Maintenance Manual for PM-565B dated Apr. 2001 (172 pages, uploaded in 4 parts) (Exhibit 94).
Technical Presentation (STMG) for PM-565B dated Jul. 1998 (216 pages) (Exhibit 95).
Dissembly and Assembly Manual for PM-565B dated Oct. 2004 (128 pages, uploaded in 4 parts) (Exhibit 96).
Systems Operating Testing & Adjusting manual for PM-565B dated May 2001 (52 pages) (Exhibit 97).
Salesgram for PM-565B dated Jun. 2001 (6 pages) (Exhibit 98).
Product Bulletin for PM-565B dated Sep. 1997 (44 pages) (Exhibit 99).
Bid Specifications for PM-565B dated Oct. 1999 (2 pages) (Exhibit 100).
Bid Specifications for PM-565B dated Jun. 2001 (4 pages) (Exhibit 101).
Sale invoices of PM-565B machines dating between Jul. 25, 2001 (Serial No. 8GS0211) and Dec. 14, 2004 (Serial No. 8GS0267) with clients name redacted for confidentiality reasons (28 pages) (Exhibit 102).
Excerpts from www.machinerytradeoff.com, www.machinerytrader.com, www.usedmachineryfinder.com and www.mascus.co.us; online listings for used Caterpillar PM-565 and PM-565B machines manufactured before the priority date of EP'004 (28 pages) (Exhibit 103).
Excerpts from Catepillar's website relating to technical manuals for PM-565, PM-565B and PB-465 offered for sale to the public (3 pages) (Exhibit 104).
Statement by Mr. Dario Sansone, Product Specialist at Catepillar Servizi Italia S.r.l., dated Mar. 30, 2018, concerning the features of the PM-565 and PM-565B machines (6 pages) (Exhibit 105).
Wirtgen First Legal Brief (Mar. 1, 2018) (20 pages) (see p. 9-11) (not prior art).
Wirtgen First Technical Brief (Mar. 6, 2019) (122 p.) (see p. 46-51) (not prior art).
CAT First Technical Brief EP 1875004 (Mar. 13, 2019) (66 pages) (not prior art).
Wirtgen Second Technical Brief (Apr. 16, 2019) (127 p.) (see p. 58-83) (not prior art).
CAT Second Technical Brief (Apr. 18, 2019) (104 pp.) (see p. 23-35) (not prior art).
CAT Third Legal Brief (Apr. 23, 2018) (32 pages) (see p. 2-4) (not prior art).
Wirtgen Third Legal Brief (Apr. 23, 2018) (30 pages) (see p. 15-20) (not prior art).
Doc. 13—Brochures of Catepillar PM 565 Cold Planer, dated Dec. 1992.
Statement of Defense (in Italian litigation) (60 pages) (not prior art).
English translation of Statement of Defense (57 pages) (not prior art).
Catepillar—Doc. 32: Parts Manual PM-565 Cold Planer (25 pages) (Sep. 2001).
Catepillar Parts Manual PM-465 Cold Planer, vol. 1 (Oct. 2000) (uploaded to EFS Web in 2 parts).

(56) References Cited

OTHER PUBLICATIONS

Caterpillar Parts Manual PM-465 Cold Planer vol. II (Oct. 2000) (uploaded to EFS Web in 2 parts).
Written Opinion of the International Searching Authority in corresponding PCT/EP2006/060907 (6 pages) (not prior art).
CAT Third Technical Brief (Oct. 16, 2019)(39 p.)(see p. 16-22)(English translation)(not prior art).
Prelimary Technical Report of CTE (Dec. 23, 2019)(114 p.)(see p. 76-90)(English translation) (not prior art).
Wirtgen Third Technical Brief (Oct. 15, 2019)(58 p.)(See p. 27-36)(English translation)(not prior art).
CAT Observations To The Preliminary Report (Jan. 15, 2020)(69 p.)(see p. 48-50)(English translation)(not prior art).
Final Technical Report of CTE (Mar. 27, 2020)(148 p.)(see p. 82-90) (English translation) (not prior art).
Wirtgen Observations To The Preliminary Report (Jan. 16, 2020)(76 p.)(see p. 49-75)(English translation)(not prior art).
Exhibit 1: Machine Design, "A second look at gearbox efficiencies", Jun. 20, 2002 (2 p.).
Exhibit 3: Catalog of GMT GmbH, Nov. 2004 (138 p.) (uploaded in 3 parts).
Exhibit 4: Catalog of Phoenix AG, Mar. 2004 (89 p.) (uploaded in 2 parts).
Exhibit 5: Centaflex-A Catalog (2004)(16 p.).

* cited by examiner

CONSTRUCTION MACHINE, IN PARTICULAR ROAD MILLING MACHINE, RECYCLER OR STABILIZER, AS WELL AS DRIVE TRAIN FOR CONSTRUCTION MACHINES OF THIS TYPE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a *reissue of U.S. patent application Ser. No. 12/985,400 filed Jan. 6, 2011, now U.S. Pat. No. 8,408,659, which is a* continuation of U.S. patent application Ser. No. 11/918,247 entitled "Construction Machine, In Particular Road Milling Machine, Recycler Or Stabilizer, As Well As Drive Train For Construction Machines Of This Type", of Busley et al., filed Oct. 11, 2007, *now U.S. Pat. No. 7,891,742,* which is a U.S. National Stage filing of PCT/EP2006/060907 having an international filing date of Mar. 21, 2006, which claims priority to DE 102005017754.9 filed Apr. 15, 2005.

BACKGROUND OF THE INVENTION

The invention concerns a construction machine, in particular a road milling machine, a recycler or a stabilizer, as well as a drive train for construction machines of this type.

Construction machines of this type are known, for instance, from DE 10031195 C1. The construction machine for working ground surfaces shows a chassis that carries a machine frame. A working drum is driven mechanically by a drive train that comprises a drive engine, a pump transfer case, a clutch and a belt drive. The direct mechanical drive of the working drum, which consists of a milling drum, can be engaged or disengaged again by means of the clutch.

The support of the drive engine must be designed in a very stiff manner, as this is also the support for the belt pulley of the belt drive on the drive side relative to the machine frame. It is understood that a coaxial, rigidly supported arrangement of the shafts connecting the elements of the drive train is required and that, with regard to the belt drive, a rigid, track-aligned arrangement of the belt pulley on the drive side and on the output side is a basic requirement for the functional performance and long life of such a belt drive. A soft, elastic support is not feasible in particular for the reason that the belt pulley on the drive side is supported in a cantilevered manner. This means that the two supporting points of the support are located on one side of the belt pulley, with the belt pulley itself projecting freely on that side that lies opposite the support.

Supporting the belt pulley on both sides is not desired because of the transport width of the machine that has to be adhered to. The stiff support of the drive train is disadvantageous in that vibrations from the drive engine are transmitted to the machine frame to a greater extent. The vibrations are not only unpleasant for the machine operator, in the form of the vibrations transmitted to him, but impair the working conditions because larger flat machine components like, for instance, hoods or tanks, are stimulated to sound vibrations that are disturbing during the operation of the machine.

The effort to increase the performance results in an increased space requirement for the drive engine that needs to be accommodated within the pre-determined fixed transport width.

SUMMARY OF THE INVENTION

The purpose of the invention is, therefore, to further develop a construction machine of the type first mentioned above, as well as a drive train for construction machines of that type, in such a manner that less vibrations from the drive engine are transmitted to the machine frame, with the drive train being sufficiently rigid at the same time to be capable of transmitting high mechanical power.

The invention provides in an advantageous manner that the elements of the drive train are divided into at least two groups, that the first group shows, i.e. includes, at least the drive engine, the second group shows at least the drive element of the traction mechanism, and that the first and the second group are connected to one another via an articulated coupling device. Dividing the drive train into two groups makes it possible to support the groups of the drive train with different degrees of rigidity on the machine frame for the purpose of reducing the transmission of vibrations from the drive engine to the machine frame. The articulated coupling device between the first and the second group is capable of balancing the different vibrational behavior of the first group and the second group due to its articulation, without impeding a high transmission of power.

In conclusion, this means that the support of the combustion engine, possibly with further elements of the drive train, in the first group may be considerably softer than the support of the elements of the drive train accommodated in the second group, which are to be attached to the machine frame in an as stiff manner as possible or in a rigid manner.

The first group with the drive engine is attached to the machine frame elastically with low spring stiffness that damps the vibrations from the drive engine for the purpose of reducing the transmission of vibrations to the machine frame, and the second group is attached to the machine frame with high spring stiffness or in a rigid manner.

Dividing the drive train into two groups makes it possible to achieve in an advantageous manner that, on the one hand, the one group that comprises the drive engine, preferably a combustion engine, is supported in a relatively soft manner at the machine frame, by way of which the vibrations from the drive engine that are transmitted to the machine frame are damped considerably, and that, on the other hand, the other group can be supported at the machine frame with high spring stiffness in a nearly rigid or rigid manner, by way of which higher forces are supported and higher outputs are transmittable as a result. In doing so, the first and the second group, which are attached to the machine frame with different degrees of rigidity, are connected to one another via an articulated coupling device so that a slight dynamic axle offset and/or angular error of the output shaft of the first group with the drive engine is permissible vis-à-vis the drive shaft of the second group.

In a preferred embodiment, it is provided that the first group comprises at least the drive engine and the device for driving at least one hydraulic pump, and the second group comprises the device for switching the torque and/or the support of a drive element of the traction mechanism on the drive side, preferably a belt drive. In this embodiment, the drive engine is coupled in a rigid manner with the device for driving the at least one hydraulic pump, and is supported together with that device elastically vis-à-vis the machine frame.

The second group shows the device for switching the torque, by means of which the power flow can be interrupted, and/or the support of the drive element of the traction mechanism on the drive side. This second group may be attached to the machine frame in a rigid or at least nearly rigid manner.

This embodiment offers the advantage that the device for driving the at least one hydraulic pump, which also generates vibrations, can be supported together with the drive engine, preferably a combustion engine, in a soft manner in the first group of the drive train. This embodiment offers the additional advantage that, in spite of the drive train for the milling drum being disengaged, the hydraulic supply of the machine is ensured when the drive engine is running. Those elements of the drive train, however, that generate only slight vibrations are combined in the second group.

In accordance with an alternative embodiment, it may be provided that the first group comprises at least the drive engine and the device for switching the torque, and the second group comprises the device for driving at least one hydraulic pump and/or the support of a drive element of the traction mechanism on the drive side.

In accordance with yet another alternative embodiment, it is provided that the first group comprises at least the drive engine, and the second group comprises the device for driving the at least one hydraulic pump, as well as the device for switching the torque and/or the support of the drive element of the traction mechanism on the drive side.

The articulated coupling device may be torsionally rigid. The articulated coupling device may, for instance, be a cardan shaft. Alternatively, the articulated coupling device may also be torsionally flexible and may, for instance, be an elastomeric coupling.

The device for driving the at least one hydraulic pump and the device for switching the torque, as well as the support of the drive element of the traction mechanism on the drive side may form an entity that is jointly attached to the machine frame with high spring stiffness or in a rigid manner.

The device for driving the at least one hydraulic pump may consist of a pump transfer case for several hydraulic pumps.

The device for switching the torque is preferably arranged between the device for driving the at least one hydraulic pump and the drive element of the traction mechanism on the drive side.

The transfer casing may show a gearbox casing with several hydraulic pumps arranged at an outer circumference of the gearbox casing, the said hydraulic pumps being capable of being jointly driven by means of the transfer case. The hydraulic pumps project from the gearbox casing, pointing towards the drive engine or pointing away from the drive engine. The coupling device extends in the interior space of the gearbox casing that is free from hydraulic pumps. The arrangement of the coupling device in the free interior space of the gearbox casing enables a compact design.

In a preferred embodiment, it is provided that the coupling device permanently couples an output shaft of the drive engine with an input shaft of the device for driving the at least one hydraulic pump and/or an input shaft of the device for switching the torque. The arrangement of the coupling device in the radially inner intermediate space of the gearbox casing, which is free from hydraulic pumps, enables a compact design of the drive train, both in that case in which the transfer case is a part of the first group, in which the hydraulic pumps point away from the drive engine, as well as in that case in which the transfer case forms the input element of the second group, in which the hydraulic pumps project in the direction of the drive engine.

The coupling device permanently couples an output shaft of the drive engine, or of the first group, with an input shaft of the device for driving the at least one hydraulic pump, or an input shaft of the device for switching the torque, or of the second group.

BRIEF DESCRIPTION OF THE DRAWINGS

In the following, embodiments of the invention are explained in more detail with reference to the drawings. The following is shown:

FIG. 1 shows a schematic cross-section of a construction machine, and namely in particular a road milling machine, a recycler or a stabilizer with a working drum 6 that is supported in a machine frame 4. Alternatively, the working drum 6 may be supported in a drum housing that is in turn firmly attached to the machine frame or may also be supported to pivot at a machine frame 4. The machine frame 4 is carried by a chassis that is not depicted in the drawings. The working drum 6 may consist of, for instance, a milling drum. The working drum 6 of the construction machine is driven by a drive train 8 that shows at least the following elements:

Figure 1:
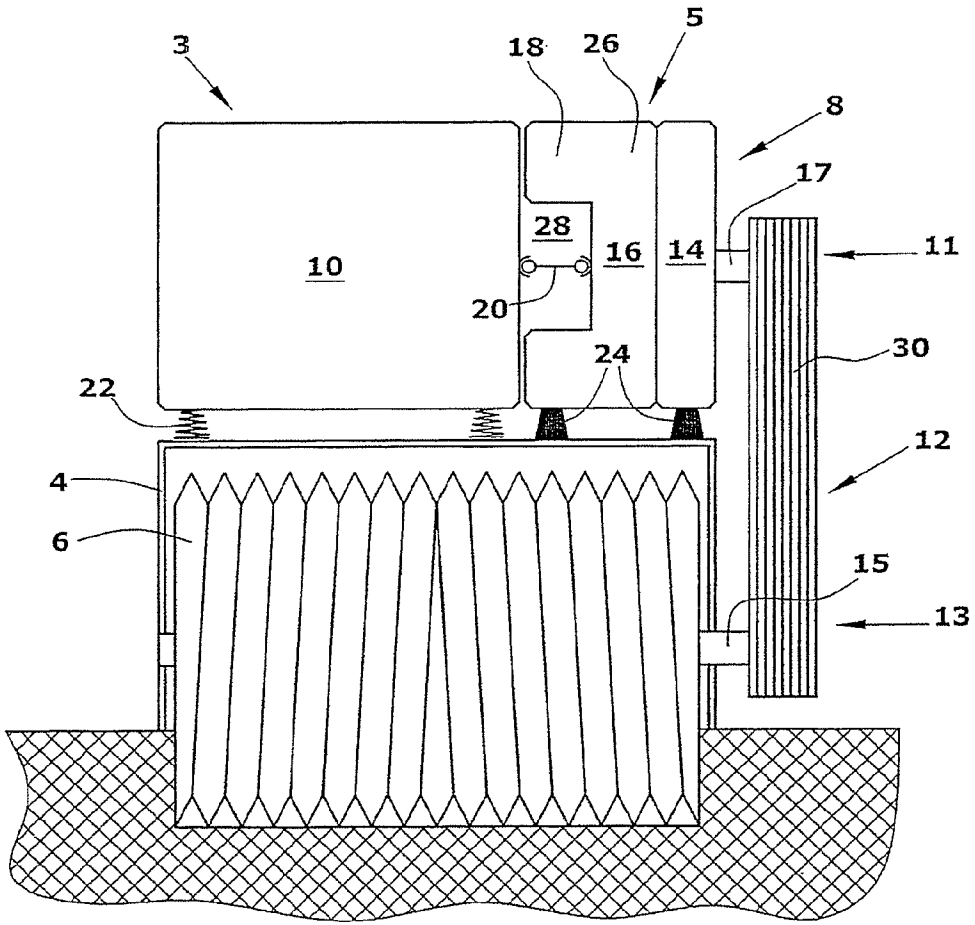
FIG. 1 a first embodiment of the invention in the example of a road milling machine, FIG. 2 a second embodiment, FIG. 3 a third embodiment, FIG. 4 a fourth embodiment, and FIG. 5 a side view of the embodiment in FIG. 4.

The drive train 8 includes a drive engine 10 that preferably consists of a combustion engine.

A traction mechanism 12 for the mechanical drive of the working drum 6 shows a drive element 11 that is coupled in a non-rotatable manner with an output shaft 17, and an output element 13 that is coupled in a non-rotatable manner with the drive shaft 15 of the working drum 6. A planetary gear may additionally be arranged between the drive shaft 15 and the working drum 6.

The traction mechanism 12 preferably is a belt drive where the drive and output elements 11, 13 consist of belt pulleys, with several drive belts 30 revolving around the said belt pulleys. Alternatively, the traction mechanism 12 may also consist of a chain drive, where the drive and output elements 11, 13 then consist of the corresponding sprockets.

The drive train 8 further shows a device for switching the torque 14, which is arranged in the drive train 8 between the drive engine 10 and the working drum 6 and preferably consists of a clutch.

The drive train 8 further includes a device 16 for driving hydraulic units, for instance, hydraulic pumps 18, where the said device 16 for driving hydraulic units is coupled with the drive engine 10.

The entire drive train 8 is divided into at least two groups, with the first group showing at least the drive engine 10 and the second group showing at least the drive element 11 of the traction mechanism 12. The first and the second groups 3, 5 are connected to one another mechanically via an articulated coupling device 20. The articulated coupling device 20 transmits the power supplied by a not depicted output shaft of the drive engine 10 to the second group 5 of the drive train 8.

In FIG. 1, the first group comprises the combustion engine 10 only, which is coupled with the second group 5 via the coupling device 20. In the embodiment of FIG. 1, the second group 5 comprises the device 16 for driving at least one hydraulic pump 18, namely a pump transfer case, the clutch 14 and the belt pulley 11 of the belt drive 12.

The combustion engine 10 is attached to the machine frame 4 by means of elastic spring/damping elements 22 showing low spring stiffness, in such a manner that the vibrations occurring in particular in a combustion engine 10, as well as structure-borne sound, are transmitted to the machine frame 4 to the smallest possible extent.

The second group 5, on the other hand, is attached to the machine frame 4 by means of spring/damping elements 24 showing high spring stiffness, so that the second group 5 is attached to the machine frame 4 in a nearly rigid manner. The different manner of support or attachment of the first and the second groups 3, 5 of the drive train 8 has the effect that, when in operation, the not depicted output shaft of the combustion engine 10 is not permanently in precise alignment with the also not depicted input shaft of the pump transfer case 16, with the articulated coupling device 20 balancing the dynamic misalignment occurring during operation without the flow of power in the drive train 8 being disturbed.

Figure 5:
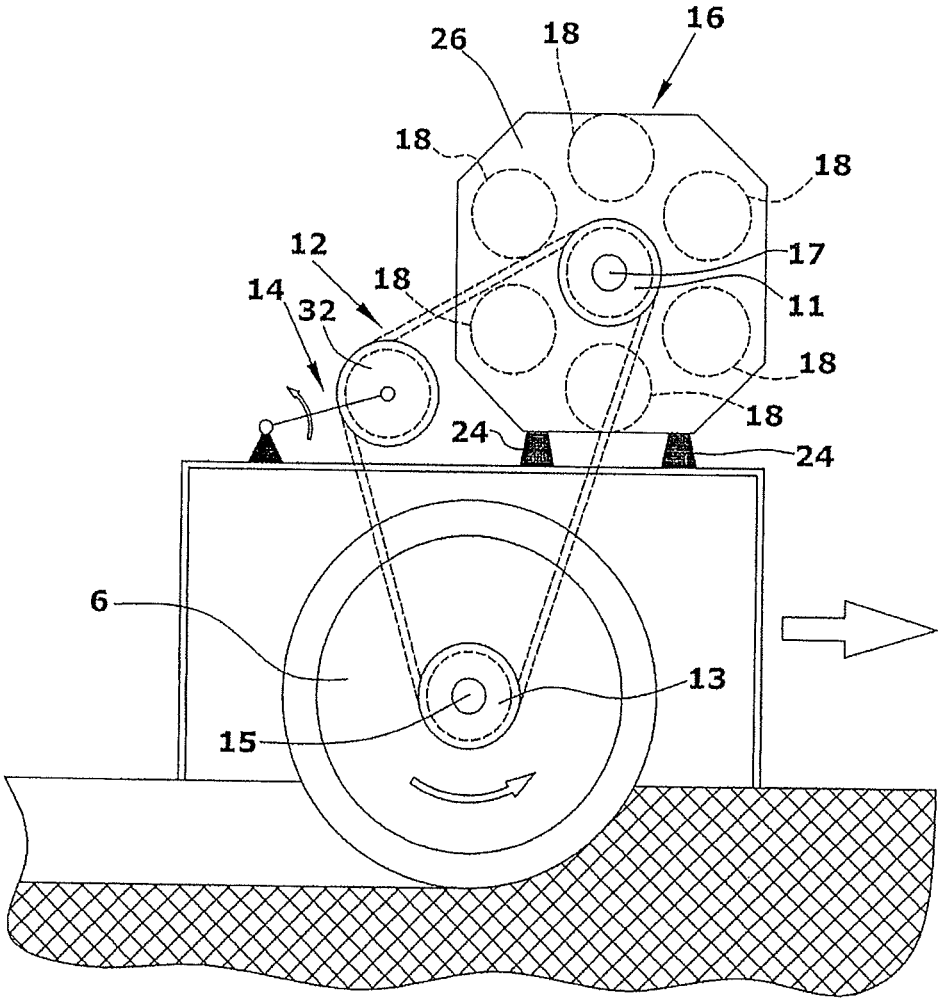

*As shown in FIGS. 1 and 5 the working drum 6 has a drum rotational axis which is the rotational axis of shaft 15. As also shown in FIGS. 1 and 5 the driven pulley 13 is also mounted on the shaft 15 and thus has a driven pulley rotational axis which is parallel and co-axial with the rotational axes of the working drum 6 and the shaft 15. As shown in FIGS. 1 and 5 the drive pulley 11 has a drive pulley rotational axis which is the rotational axis of the shaft 17 on which the drive pulley is mounted. As further shown in FIGS. 1 and 5 the drive pulley 11 and the driven pulley 13 are aligned with each other in the direction that the drive belts 30 extend, and the rotational axes of the drive pulley 11 and the driven pulley 13 are parallel to each other. And as is shown in FIG. 1 an output axis of the drive engine 10 is aligned with an input axis of the hydraulic pump drive device 16 and with an input axis of the drive pulley 11 prior to operation of the construction machine. The articulated coupling device 20 accommodates a lack of precise alignment between the output axis of the drive engine 10 and the input axes of the hydraulic pump drive device 16 and the drive pulley 11 due to dynamic movement of the drive engine 10 relative to the second group 5 during operation of the construction machine.*

Dividing the drive train and supporting the components of the drive train 8 in a different manner achieves that considerably less vibrations are transmitted from the combustion engine 10 to the machine frame 4. In this way, it is further prevented that larger flat machine components are stimulated to sound vibrations that are disturbing during the operation of the machine.

The articulated coupling device 20 may be torsionally rigid, and may consist of a cardan shaft.

Alternatively, the articulated coupling device 20 may also be torsionally flexible, where the coupling device then consists of an elastomeric coupling.

Figure 2:
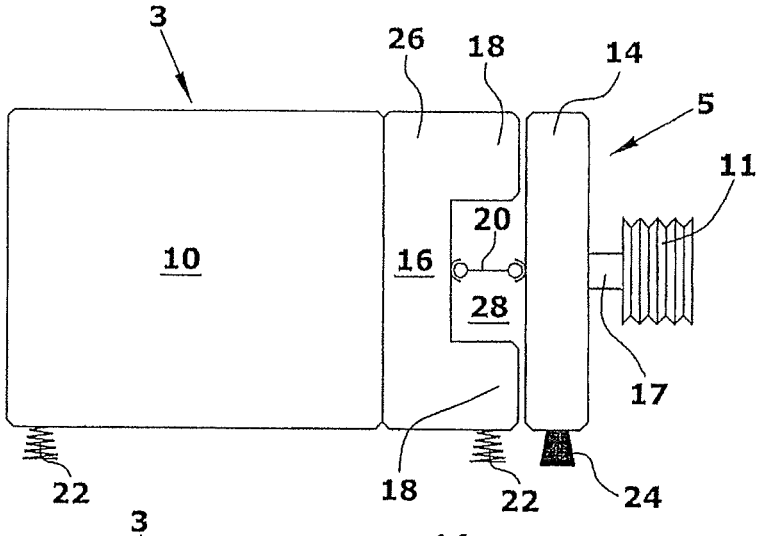

FIG. 2 shows a second embodiment, in which the first group 3 comprises the combustion engine 10 and the pump transfer case 16. As in the embodiment of FIG. 1, the pump transfer case 16 shows several hydraulic pumps 18 that axially project from the gearbox casing 26 of the pump transfer case 16, preferably in a circumferentially uniformly distributed manner.

A spur gear is arranged inside the pump transfer case, which jointly drives the individual hydraulic pumps. The arrangement of the hydraulic pumps 18 results in a central free interior space 28 between the hydraulic pumps 18, in which the coupling device 20 may extend which serves to connect the first and the second groups 3, 5 of the drive train 8. This design of the pump transfer case 16 with a free interior space 28 enables the available space for arranging the drive train 8 across the width of the machine to be used in a better way, so that a more powerful combustion engine 10 can be used due to the space-saving arrangement of the components of the drive train 8.

In the embodiment of FIG. 2, the pump transfer case 16 is also included in the first group, so that vibrations that might be coming from the pump transfer case can also be absorbed by the spring/damping [element] *elements* 22.

The second group 5 is formed by the clutch 14 and the belt pulley 11 of the belt drive 12. By means of the coupling device 20, the power of the combustion engine is first transmitted to the clutch 14 and then to the belt pulley 11.

*As shown in FIG. 2 an output axis of the drive engine 10 is aligned with an input axis of the clutch 14 and with an input axis of the drive pulley 11 prior to operation of the construction machine. The articulated coupling device 20 accommodates a lack of precise alignment between the output axis of the drive engine 10 and the input axes of the clutch 14 and the drive pulley 11 due to dynamic movement of the drive engine 10 relative to the second group 5 during operation of the construction machine.*

Insofar as the drive belts 30 and the second belt pulley 13, which serves as output element, are also part of the drive train 8, it is to be stated that these are also supported rigidly vis-à-vis the machine frame 4, namely in that the second belt pulley 13 is arranged on the drive shaft 15 of the working drum 6.

In a further, not depicted variant of the embodiment of FIG. 2, the pump transfer case 16 may be arranged on that side of the combustion engine 10 that lies opposite the coupling device 20, so that in this case the combustion engine 10 and the pump transfer case 16 also form the first group 3 of the drive train. This embodiment is advantageous when a good accessibility of the components of the drive train 8 is desired.

Figure 3:
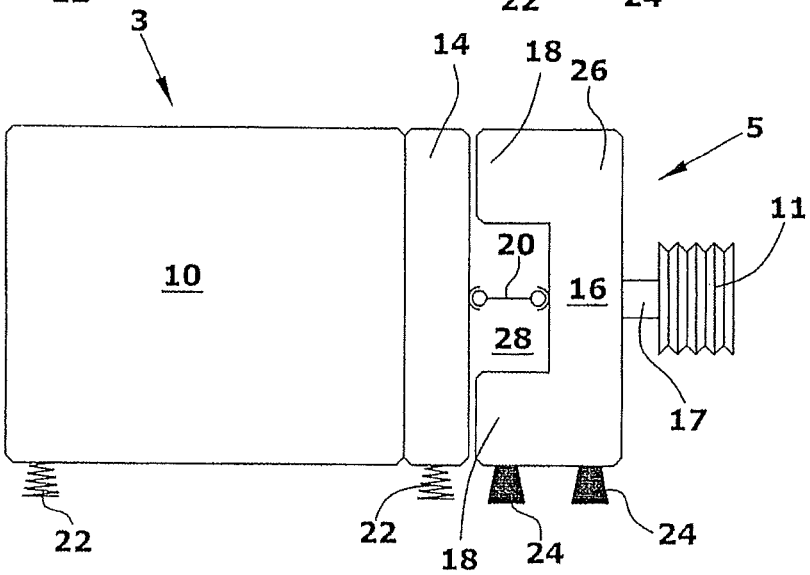

In the embodiment of FIG. 3, the first group 3 of the drive train comprises the combustion engine 10 and the clutch 14. This embodiment also offers the advantage of a good usability of the available width of the machine frame 4.

Figure 4:
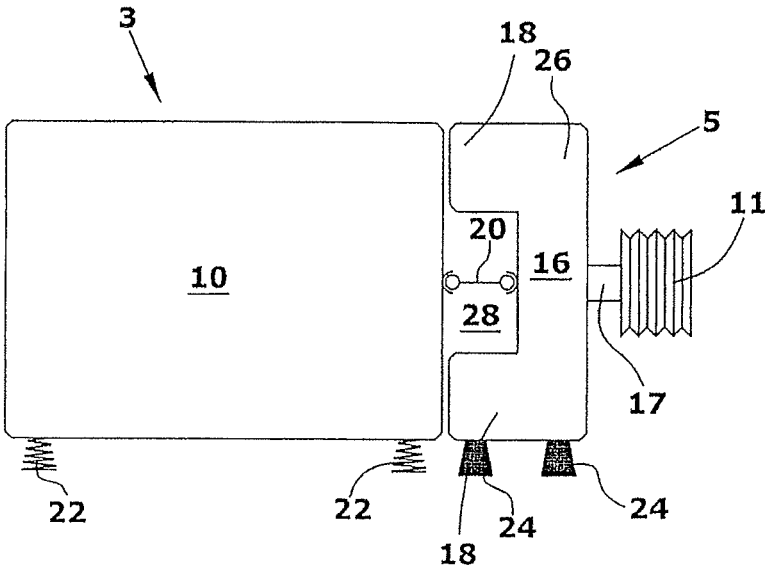

FIGS. 4 and 5 show an embodiment in which the first group 3 of the drive train 8 is formed by the combustion engine 10 that is coupled with the pump transfer case 16 via the coupling device 20. With the belt pulley 11 of the belt drive 12, the pump transfer case *16* forms the second group 5 of the drive train 8, which is supported on the machine frame 4 in a rigid or nearly rigid manner.

As can be seen from FIG. 5, the pump transfer case *16* shows, for instance, six hydraulic pumps 18 that are arranged in a circular manner and with, for instance, the same mutual distance to one another around the output shaft 17 of the second group 5 of the drive train 8.

The clutch 14 is formed by the tensioning idler 32 of the belt drive 12, which can be actuated in the idling condition of the combustion engine 10. When the tensioning idler 32 is in that position in which the drive belts 30 are tensioned, then the power of the combustion engine 10 can be transmitted to the working drum 6. When the tensioning idler 32 is swivelled against the direction of the arrow that can be seen in FIG. 5, then no power can be transmitted any longer, so that the tensioning device with the tensioning idler 32 can be used as a clutch.

Although a preferred embodiment of the invention has been specifically illustrated and described herein, it is to be understood that minor variations may be made in the apparatus without departing from the spirit and scope of the invention, as defined by the appended claims.

What is claimed is:

1. A method of operating a construction machine, the construction machine including a machine frame carried by a chassis, a working drum, and a drive train, the drive train including at least a drive engine component, [a traction drive component for driving the working drum,] a clutch component, [and] a hydraulic pump drive component, *and a traction drive for driving the working drum including a drive pulley, a driven pulley attached to the working drum, and a drive belt connecting the pulleys,* the method comprising:

(a) driving a subset of the components of the drive train from the drive engine component with an articulated coupling connected between the drive engine component and the subset of the components, the subset including at least *the drive pulley of* the traction drive [component for driving the working drum], *the clutch component and the hydraulic pump drive component, with the clutch component being located between the hydraulic pump drive component and the drive pulley*;

(b) supporting the drive engine component from the machine frame elastically with a first spring stiffness; and (c) supporting the subset of the components from the machine frame *in a rigid manner or* with a second spring stiffness[, the second spring stiffness] being relatively higher than the first spring stiffness*;*

*wherein the drive engine component has an output axis aligned with an input axis of the hydraulic pump drive component and with an input axis of the drive pulley prior to operation of the construction machine; and*

*wherein in step (a) the articulated coupling accommodates a lack of alignment between the output axis of the drive engine component and the input axes of the hydraulic pump drive component and the drive pulley due to dynamic movement of the drive engine component relative to the subset of the components during operation of the construction machine.*

2. The method of claim 1, further comprising:

in step (a), accommodating movement of the drive engine component relative to the subset of the components of the drive train by articulation of the articulated coupling.

3. The method of claim 1, wherein:

step (c) further comprises rigidly supporting the subset of the components from the machine frame.

4. The method of claim 1, wherein:

in step (a) the articulated coupling is torsionally rigid.

5. The method of claim 1, wherein:

in step (a), the articulated coupling comprises a cardan shaft.

6. The method of claim 1, wherein:

in step (a), the articulated coupling is torsionally flexible.

7. The method of claim 6, wherein:

in step (a), the articulated coupling comprises an elastomeric coupling.

8. The method of claim 1, wherein:

in step (a)[, the subset of the components further includes the clutch component, and the hydraulic pump drive component, and wherein] *the drive pulley of* the traction drive [component], the clutch component and the hydraulic pump drive component are jointly supported as a combined subset entity; and step (c) further comprises supporting the combined subset entity from the frame *in the rigid manner or* with the second spring stiffness.

[9. The method of claim 1, wherein:

in step (a), the subset of the components of the drive train further includes the clutch component and the hydraulic pump drive component, with the clutch component being located between the hydraulic pump drive component and the traction drive component.]

10. The method of claim 1, further comprising:

operating the clutch component and thereby switching on and off [the] *a* torque from the drive engine component to the working drum.

[11. The method of claim 1, wherein:

in step (a), the clutch component is connected to the drive engine component, and the articulated coupling is located between the clutch component and the subset of the components of the drive train.]

12. [The method of claim 1, wherein:] *A method of operating a construction machine, the construction machine including a machine frame carried by a chassis, a working drum, and a drive train, the drive train including at least a drive engine component, a clutch component, a hydraulic pump drive component, and a traction drive for driving the working drum including a drive pulley, a driven pulley attached to the working drum, and a drive belt connecting the pulleys, the method comprising:*

*(a) driving a subset of the components of the drive train from the drive engine component with an articulated coupling connected between the drive engine component and the subset of the components, the subset including at least the drive pulley of the traction drive and the clutch component;*

*(b) supporting the drive engine component from the machine frame elastically with a first spring stiffness; and*

*(c) supporting the subset of the components from the machine frame in a rigid manner or with a second spring stiffness being relatively higher than the first spring stiffness;*

*wherein the drive engine component has an output axis aligned with an input axis of the clutch component and with an input axis of the drive pulley prior to operation of the construction machine;*

*wherein* in step (a), [the subset of the components of the drive train further includes the clutch component, and] the articulated coupling is connected between the hydraulic pump drive component and the subset of the components*; and*

*wherein in step (a) the articulated coupling accommodates a lack of alignment between the output axis of the drive engine component and the input axes of the clutch component and the drive pulley due to dynamic movement of the drive engine component relative to the subset of the components during operation of the construction machine.*

[13. The method of claim 1, wherein:

the traction drive component includes a drive pulley, a driven pulley attached to the work drum, and a drive belt connecting the pulleys.]

14. A construction machine, comprising:

a machine frame carried by a chassis;

a working drum;

a drive train including at least the following elements:

a drive engine;

a traction drive assembly for mechanically driving the working drum, the traction drive assembly including a drive [element] *pulley*, [an output element] *a driven pulley*, and a [traction element] *drive belt connecting the pulleys*;

a clutch for switching [the] *a* torque between the drive engine and the working drum; and a hydraulic pump drive; and wherein the elements of the drive train are divided into at least a first subset and a second subset; and wherein the drive train further includes an articulated coupling connecting the first subset to the second subset; and wherein the first subset includes at least the drive engine; and wherein the second subset includes [at least one element selected from the group consisting of]:

the hydraulic pump drive;

the clutch; and the drive [element] *pulley* of the traction drive assembly; and wherein the first subset is attached to the machine frame elastically with a lower spring stiffness so that transmission of vibrations to the machine frame is reduced, and the second subset is attached to the machine frame with a higher spring stiffness or in a rigid manner*;*

*wherein the clutch is connected between the hydraulic pump drive and the drive pulley;*

*wherein the drive engine has an output axis aligned with an input axis of the hydraulic pump drive and with an input axis of the drive pulley prior to operation of the construction machine; and*

*wherein the articulated coupling accommodates a lack of alignment between the output axis of the drive engine and the input axes of the hydraulic pump drive and the drive pulley due to dynamic movement of the first subset relative to the second subset during operation of the construction machine.*

[15. The construction machine of claim 14, where:

the second subset includes the hydraulic pump drive, the clutch, and the drive element of the traction drive assembly; and the clutch is connected between the hydraulic pump drive and the drive element of the traction drive assembly.]

16. The construction machine of claim 14, wherein the articulated coupling is torsionally rigid.

17. The construction machine of claim 14, wherein the articulated coupling includes a cardan shaft.

18. The construction machine of claim 14, wherein the articulated coupling is torsionally flexible.

19. The construction machine of claim 18, wherein the articulated coupling comprises an elastomeric coupling.

[20. The construction of claim 14, wherein:

the first subset further includes the clutch.]

[21. The construction machine of claim 14, wherein:

the hydraulic pump drive includes:

a gearbox casing having an outer circumference and having an interior space; and a plurality of hydraulic pumps arranged radially outward from the interior space so that the interior space is free from hydraulic pumps, the pumps projecting from the gearbox casing and pointing either towards or away from the drive engine; and the articulated coupling extends into the interior space of the gearbox casing.]

*22. The method of claim 1, wherein:*

*in step (a) the drive pulley, the clutch component and the hydraulic pump drive component are jointly supported as a combined subset entity; and*

*step (c) further comprises supporting the combined subset entity from the frame with the second spring stiffness.*

*23. The method of claim 1, wherein:*

*in step (a), the articulated coupling is torsionally flexible and includes an elastomeric coupling;*

*in step (a) the drive pulley, the clutch component and the hydraulic pump drive component are jointly supported as a combined subset entity; and*

*step (c) further comprises rigidly supporting the combined subset entity from the frame.*

*24. The method of claim 23, wherein:*

*the construction machine is a road milling machine.*

*25. The construction machine of claim 14, wherein:*

*the drive pulley, the clutch and the hydraulic pump drive are jointly supported as a combined subset entity; and*

*the combined subset entity is attached to the machine frame with the higher spring stiffness or in a rigid manner.*

*26. The construction machine of claim 25, wherein:*

*the articulated coupling is torsionally flexible and comprises an elastomeric coupling.*

*27. The construction machine of claim 25, wherein:*

*the combined subset entity is rigidly attached to the machine frame.*

*28. The construction machine of claim 14, wherein:*

*the second subset is rigidly attached to the machine frame.*

*29. The construction machine of claim 14, wherein:*

*the articulated coupling permanently couples an output shaft of the drive engine with an input shaft of the hydraulic pump drive.*

*30. The construction machine of claim 14, wherein:*

*the hydraulic pump drive includes:*

*a gearbox casing;*

*a plurality of hydraulic pumps projecting from the gearbox casing; and*

*the hydraulic pump drive having an interior space free of hydraulic pumps; and*

*the articulated coupling extends into the interior space of the hydraulic pump drive.*

*31. The construction machine of claim 30, wherein:*

*each of the pumps projects from the gearbox casing and points towards the drive engine.*

*32. The construction machine of claim 14, wherein:*

*the articulated coupling is torsionally flexible and includes an elastomeric coupling; and*

*the hydraulic pump drive, the clutch, and the drive pulley are jointly supported as a combined subset entity, and the combined subset entity is rigidly attached to the machine frame.*

*33. The construction machine of claim 32, wherein:*

*the construction machine is a road milling machine.*

*34. A construction machine, comprising:*

*a machine frame carried by a chassis;*

*a working drum;*

*a drive train including at least the following elements:*

*a drive engine;*

*a traction drive assembly for mechanically driving the working drum, the traction drive assembly including a drive element, an output element, and a traction element;*

*a clutch for switching a torque between the drive engine and the working drum; and*

*a hydraulic pump drive; and*

*wherein the elements of the drive train are divided into at least a first subset and a second subset; and*

*wherein the drive train further includes an articulated coupling connecting the first subset to the second subset; and*

*wherein the first subset includes at least the drive engine; and*

*wherein the second subset includes the drive element of the traction drive assembly and at least one element selected from the group consisting of:*

*the hydraulic pump drive; and*

*the clutch; and*

*wherein the first subset is attached to the machine frame elastically with a lower spring stiffness so that transmission of vibrations to the machine frame is reduced, and the second subset is attached to the machine frame with a higher spring stiffness or in a rigid manner; and*

*wherein the hydraulic pump drive includes:*

*a gearbox casing;*

*a plurality of hydraulic pumps projecting from the gearbox casing; and*

*the hydraulic pump drive having an interior space free of hydraulic pumps; and*

*wherein the articulated coupling extends into the interior space of the hydraulic pump drive;*

*wherein the drive engine has an output axis aligned with an input axis of the drive element and with an input axis of one of the hydraulic pump drive and the clutch prior to operation of the construction machine; and*

*wherein the articulated coupling accommodates a lack of alignment between the output axis of the drive engine and the input axes of the drive element and one of the hydraulic pump drive and the clutch due to dynamic movement of the first subset relative to the second subset during operation of the construction machine.*

*35. The construction machine of claim 34, wherein:*

*each of the pumps projects from the gearbox casing and points either towards or away from the drive engine.*

*36. The construction machine of claim 34, wherein the articulated coupling is torsionally rigid.*

*37. The construction machine of claim 36, wherein the articulated coupling includes a cardan shaft.*

*38. The construction machine of claim 34, wherein the articulated coupling is torsionally flexible.*

*39. The construction machine of claim 38, wherein the articulated coupling comprises an elastomeric coupling.*

*40. The construction machine of claim 34, wherein:*

*the drive element of the traction drive assembly, the clutch and the hydraulic pump drive are jointly supported as a combined subset entity; and*

*the combined subset entity is attached to the machine frame with the higher spring stiffness or in a rigid manner.*

*41. The construction machine of claim 40, wherein:*

*the combined subset entity is rigidly attached to the machine frame.*

*42. The construction machine of claim 34, wherein:*

*the second subset is rigidly attached to the machine frame.*

*43. The construction machine of claim 34, wherein:*

*the articulated coupling permanently couples an output shaft of the drive engine with an input shaft of the hydraulic pump drive.*

*44. The construction machine of claim 34, wherein:*

*the articulated coupling is torsionally flexible and includes an elastomeric coupling;*

*the second subset includes the hydraulic pump drive, the clutch, and the drive element of the traction drive assembly;*

*the clutch is connected between the hydraulic pump drive and the drive element of the traction drive assembly; and*

*the hydraulic pump drive, the clutch, and the drive element of the traction drive assembly are jointly supported as a combined subset entity, and the combined subset entity is rigidly attached to the machine frame.*

*45. The construction machine of claim 44, wherein:*

*the construction machine is a road milling machine; and*

*the drive element includes a drive pulley, the output element includes a driven pulley and the traction element includes a drive belt connecting the pulleys.*

* * * * *